Figure 1:
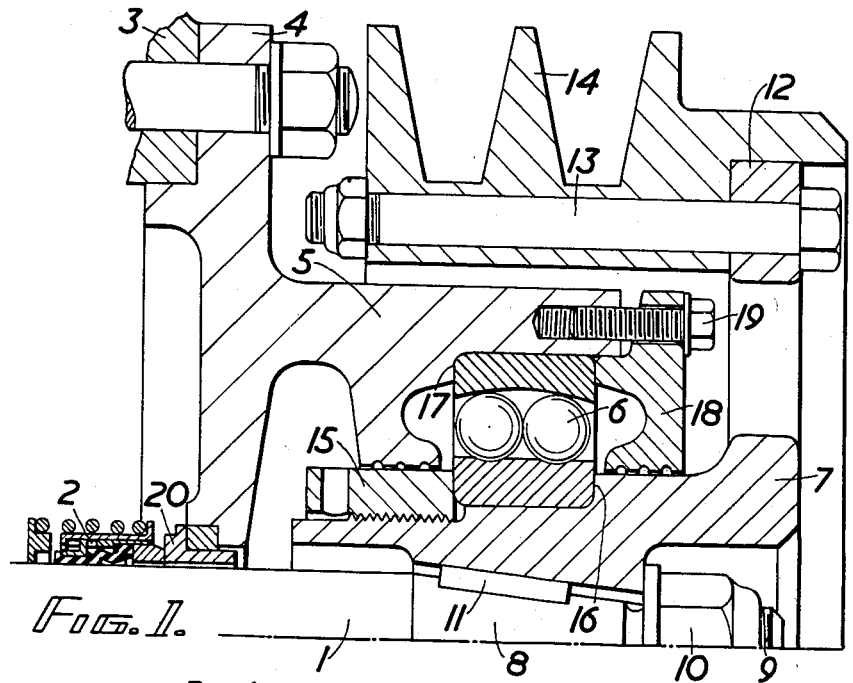

Dec. 27, 1955   F. W. McCOMBIE   2,728,615
PUMPS OR COMPRESSORS
Filed Feb. 10, 1953   2 Sheets-Sheet 1

INVENTOR
FREDERICK W. McCOMBIE
BY
ATTORNEY

INVENTOR
FREDERICK W. McCOMBIE

United States Patent Office 2,728,615
Patented Dec. 27, 1955

2,728,615

PUMPS OR COMPRESSORS

Frederick W. McCombie, London, England, assignor to Megator Pumps & Compressors Limited, London, England Application February 10, 1953, Serial No. 336,168

Claims priority, application Great Britain February 15, 1952

4 Claims. (Cl. 308—187.1)

This invention relates to rotary pumps or compressors which include a rotor shaft rotatably mounted in bearings associated with the pump casing, suitable sealing means being associated with the shaft for the purpose of preventing seepage of liquid along the surface of the shaft and its escape from the pump casing, if the pressure in that part of the casing containing the shaft is above atmospheric pressure, or the entry of air if the pressure in that part of the casing is lower than atmospheric pressure. Although applicable broadly to rotary pumps or compressors of the above kind the invention is particularly applicable to pumps or compressors forming the subject of Patents Nos. 2,561,808; 2,561,809 and 2,561,810. Such pumps or compressors include a displacement chamber mounted for reciprocating movement within the pressure chamber of the pump casing, a rotor in the form of an eccentric carried by a shaft rotatably mounted in the pump casing, the eccentric lying within the displacement chamber and engaging the walls of the latter at two oppositely disposed points on the periphery of the eccentric to provide a substantially fluid tight seal and by virtue of its rotational movement within said chamber give rise to the desired displacement effect, said displacement chamber being mounted for reciprocating movement in the plane of rotation of the eccentric and in contact with a guiding surface usually known as a port plate located within the pump casing, the displacement chamber and port plate being formed with co-operating ports which under the reciprocating action of the displacement chamber control the flow of fluid to and from the chamber.

The chief object of the present invention is to enable the rotor shaft to be readily removed for replacement purposes or for attention to the sealing means or alternatively to permit removal of the sealing means over the end of the shaft without disturbing the bearings or driving parts of the pump, such as, for example, the usual driving pulley or coupling carried by or coupled with the rotor shaft, or the prime mover. The invention applies particularly when the sealing means encircling the shaft is not split and must be fitted and removed over the end of the shaft.

According to the present invention the end of the rotor shaft is mounted detachably in a hub, the bearing for supporting the end of the shaft being mounted between said hub or a part rigidly associated therewith and a fixed part carried by or forming part of the pump casing or an extension thereof, in such manner that on separating the shaft and hub the sealing means can be removed without disturbing the bearing.

With such an arrangement it is merely necessary when withdrawing the rotor shaft to release the detachable connection and withdraw the shaft through the pump casing that is to say, through the opposite side of the pump, leaving the bearing and hub and its associated parts in their normal position. The sealing means carried by the shaft will come away with the shaft and consequently can be easily replaced.

It is preferred to use a ball bearing, preferably of the spherical seat or self-aligning type, in which case the inner race may be mounted on the hub, whilst the outer race is mounted in a tubular extension of the pump casing or of a cover attached to the casing and forming a housing for the hub. Alternatively, the inner race may be mounted on the tubular extension, whilst the outer race is mounted in a part rigidly associated with the hub, such as, for example, a driving pulley. It is preferred that the detachable connection shall take the form of a straight taper on the shaft and a corresponding taper in the hub, the end of the shaft being threaded to engage corresponding screw threads in the interior surface of the hub, the hub being therefore screwed on to the end of the shaft until the taper surfaces frictionally engage. Alternatively, the taper parts may be keyed together against relative rotation, the hub being held on the shaft and the tapering surfaces in engagement by means of a nut in threaded connection with the shaft's extremity.

In the case of the construction in which the inner race is carried by the tubular extension, this construction, although a little more complicated, may nevertheless be modified so that the sealing means can be easily withdrawn over the end of the shaft, whilst the shaft is actually in position. This modification consists in detachably connecting the hub with the component with which the outer race is associated, such as the driving pulley, and interposing between the hub and the inner surface of the tubular extension on which the inner race is mounted, a housing or sleeve which serves to maintain the stationary component of the sealing means in position. In such a case the hub may be removed from the end of the shaft and from the pulley and the housing or sleeve then removed, thus exposing the sealing means and enabling it to be slid off the end of the shaft, whilst the shaft is still in position in the pump casing and without in any way disturbing the bearing or its associated driving pulley.

Figure 2:
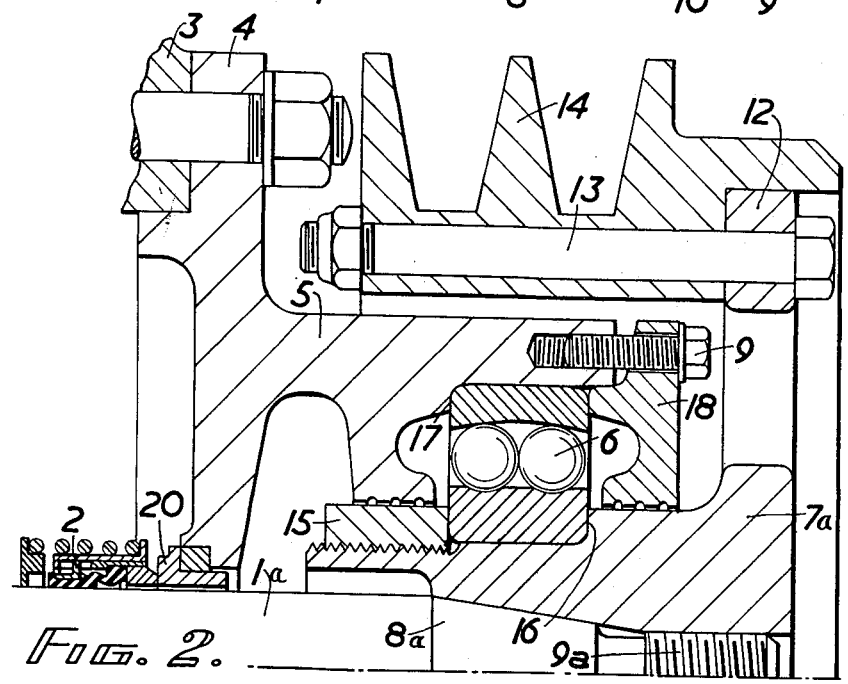
Figure 3:
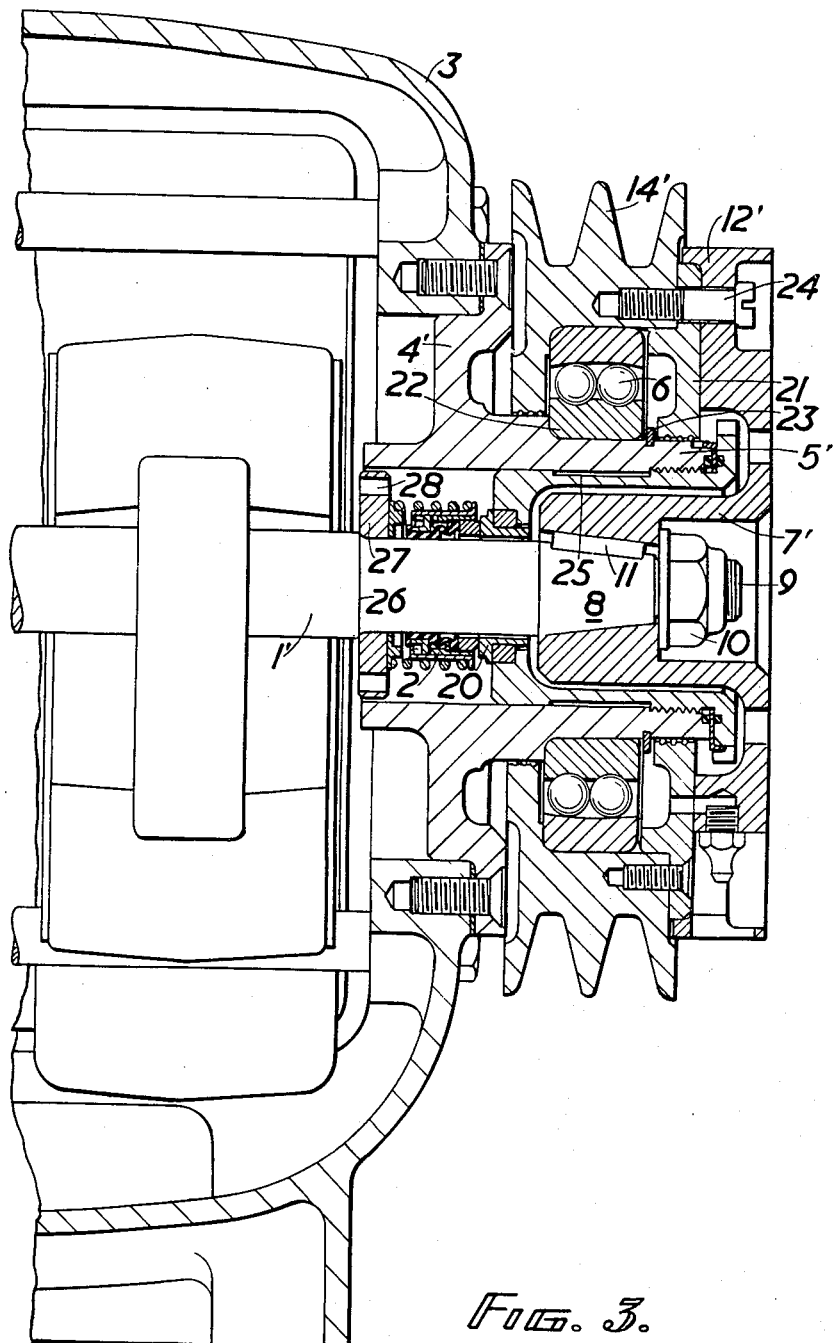

In order that the invention may be clearly understood and readily carried into effect the invention is hereinafter described with reference to the accompanying drawings, in which:

Figures 1 and 2 are fragmentary sectional views illustrating one method of carrying out the present invention, the two views differing in that they show alternative methods of connecting the hub to its associated shaft; and Figure 3 is a similar view illustrating an alternative construction, this view showing part of the pump or compressor.

In Figures 1 and 2, which illustrate an embodiment of the invention in which the construction is perhaps more simple, but on the other hand necessitates removal of the shaft 1 through the opposite side of the pump together with the sealing means 2 if it is desired to renew the sealing means at any time, the pump casing 3 carries a cover 4 formed with an integral extension which forms a housing 5 for the bearing 6, the latter being of the ball type, the outer race being fitted into the housing. The hub 7 in the case of Figure 1 is formed with an internal straight taper which engages a corresponding straight taper 8 on the shaft, the extremity of the shaft being screw threaded as at 9 to receive a securing nut 10. The straight taper 8 carries a key 11 which engages with a keyway in the interior of the hub. In the case of Figure 2 the key is omitted from the taper 8a, the extremity of the shaft 1a being screw threaded as at 9a to engage corresponding screw threads in the interior of the hub 7a. The hub, 7 or 7a, may be formed with a peripheral flange 12 which may be connected by bolts 13 to the driving pulley 14, coupling or other driving member.

In this construction the inner race is maintained in position on the hub by a securing ring 15 in threaded engagement with the hub, the ring maintaining the inner race in abutting relationship with a shoulder 16 on the hub.

The outer race is held in abutting relationship with a shoulder 17 in the housing by a retaining ring 18 which surrounds the hub and is connected to the housing 5 by screws 19.

The sealing means 2 may be of well known type incorporating rotating components in rubbing engagement with a stationary component 20, the parts being held in rubbing engagement by means of an associated coil spring, the sealing means in this construction being disposed within the pump casing, the stationary component being associated with the inner edge of an inwardly directed flange on the cover through which the end of the shaft projects. The flange on the cover which carries the stationary component of the seal is in special relationship with the end of the hub and this space may be vented to the atmosphere by a drain hole, passage or pipe to permit the escape of any liquid that may leak through the seal. A thrower or similar device may be fitted to the shaft at this point to throw off any escaping liquid and to prevent it from penetrating to the bearing.

In the alternative, but slightly more complicated, construction illustrated in Figure 3, in which the sealing means 2 can be withdrawn over the end of the shaft 1' without removal of the shaft from the pump casing 3, the outer race is held by means of a retaining ring 21 in abutting relationship to a housing 14' which may also serve as a pulley or may have a pulley or other driving member fastened to it.

The inner race is mounted on the tubular extension 5' which forms a part of the cover 4' on that side of the pump, the inner race being held in engagement with a shoulder 22 on the tubular extension by means of a circlip 23 or other securing device. The hub 7' in this case is formed with a peripheral flange 12' of quite large diameter which is secured by screws 24 or the like to one face of the housing 14', the screws also securing the retaining ring 21 in position. The hub which may be attached to the rotor shaft by either of the means hereinbefore described or in any alternative way is in spacial relationship with respect to the interior of the tubular extension and consequently an inner housing in the form of a sleeve 25 may be interposed between these parts which sleeve encircles the shaft and carries the stationary component 20 of the sealing means, the rotating components being held in position axially by means of a shoulder 26 on the shaft. A circular plate 27 may be interposed between the rotating components and the shoulder 26, this plate being slightly smaller in diameter than the internal diameter of the tubular extension, so that it clears the tubular extension when the pump is running but rests in it and supports the shaft when the hub has been removed and the sealing means is being extracted. The plate 27 may be formed with a number of holes 28 around its periphery for the insertion of an extractor tool so that when the hub 7' and sleeve 25 have been removed over the end of the shaft the plate 27 may be easily withdrawn together with the sealing means.

It will be appreciated that in both of the constructions described in detail the ball bearing will be of comparatively large diameter, as it will not only enclose the shaft, but also the hub, or in the last mentioned construction, the tubular extension. In the case of a belt-driven pump it is preferred that the bearing shall be arranged centrally with respect to the driving pulley in the direction of the axis of rotation, whilst the centre of connection between the hub and its associated shaft will also lie in the same plane, the bearing, pulley and point of connection between the hub and shaft thus all lying in a common plane. Any bending moment in the shaft resulting from the hydraulic or mechanical forces acting on the rotor will be substantially zero at the centre line of the bearing, and with such an arrangement the connection between the shaft and the hub has therefore to transmit only the torque and the side thrust and is more secure than it would be if a substantial bending moment also had to be transmitted. The pull of the belts will also be in line with the bearing and consequently no substantial bending moment due to this cause will be transmitted to the shaft.

The invention is equally applicable to pumps having horizontal or vertically arranged rotor shafts.

I claim:

1. The combination with a rotary shaft and a housing surrounding the shaft, of a hub detachably mounted on the shaft and extending into said housing, a bearing assembly for supporting the end of the shaft and mounted on said hub within said housing, means fixed to said hub and said housing and engaging said bearing assembly to retain said bearing assembly in position, sealing means mounted on said shaft inwardly of and cooperating with said housing to seal between said shaft and said housing, and means for detachably mounting said housing on a casing, whereby said housing may be removed for replacing the sealing means without removing said bearing assembly.

2. The combination as in claim 1, wherein a peripheral flange carrying a driving pulley is mounted on said hub, said pulley surrounding said housing and lying in the same general plane as said bearing assembly.

3. The combination as in claim 2, wherein said bearing is of the antifriction type having an inner race mounted on the hub and an outer race mounted in the housing, said inner race being engaged by the retaining means fixed to the hub and said outer race being engaged by the retaining means fixed to the housing.

4. The combination with a casing and a rotary shaft in said casing with one end of the shaft extending beyond said casing, a tubular extension on said casing and surrounding the extended end of said shaft, a hub detachably mounted on the extended end of said shaft and having a portion concentric with said tubular extension, a bearing assembly for supporting the end of the shaft and mounted between said hub and said tubular extension with said hub and tubular extension jointly forming a housing for said bearing assembly, means on said hub and said tubular extension and engaging said bearing assembly to retain said assembly in position, and sealing means mounted on said shaft inwardly of and cooperating with said tubular extension to seal between said shaft and said casing, at least the portion of said tubular extension which cooperates with said sealing means being removably mounted for replacing said sealing means without dismantling said bearing assembly.

References Cited in the file of this patent

UNITED STATES PATENTS

| Number | Name | Date |
|---|---|---|
| 1,908,621 | Avilla | May 9, 1933 |
| 1,930,586 | Delaval-Crow | Oct. 17, 1933 |
| 2,025,834 | Tautz | Dec. 31, 1935 |
| 2,251,760 | Schantz et al. | Aug. 5, 1941 |
| 2,561,808 | McCombie | July 24, 1951 |
| 2,570,452 | Hougue | Oct. 9, 1951 |
| 2,571,377 | Olah | Oct. 16, 1951 |
| 2,667,048 | Whitfield | Jan. 26, 1954 |